June 16, 1942.  R. J. BEUTEL  2,286,983
DOUGH ROUNDING MECHANISM
Filed May 9, 1940   3 Sheets-Sheet 1

INVENTOR
ROBERT J. BEUTEL
BY
ATTORNEY

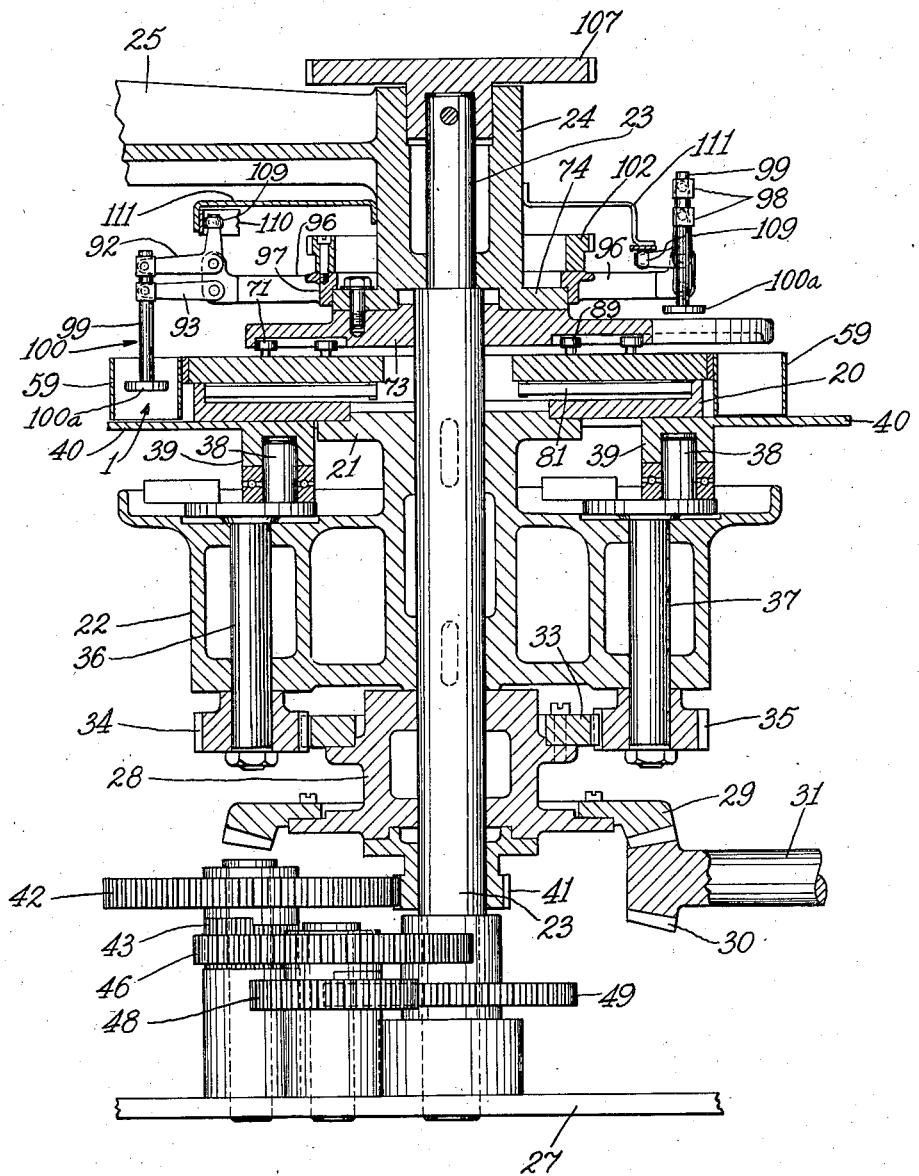

June 16, 1942.   R. J. BEUTEL   2,286,983
DOUGH ROUNDING MECHANISM
Filed May 9, 1940   3 Sheets-Sheet 3
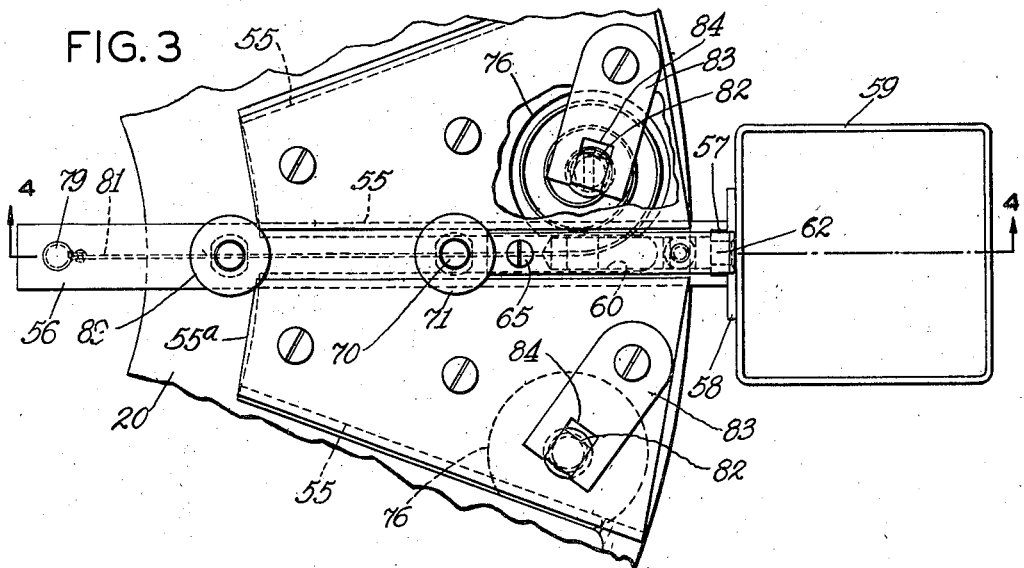
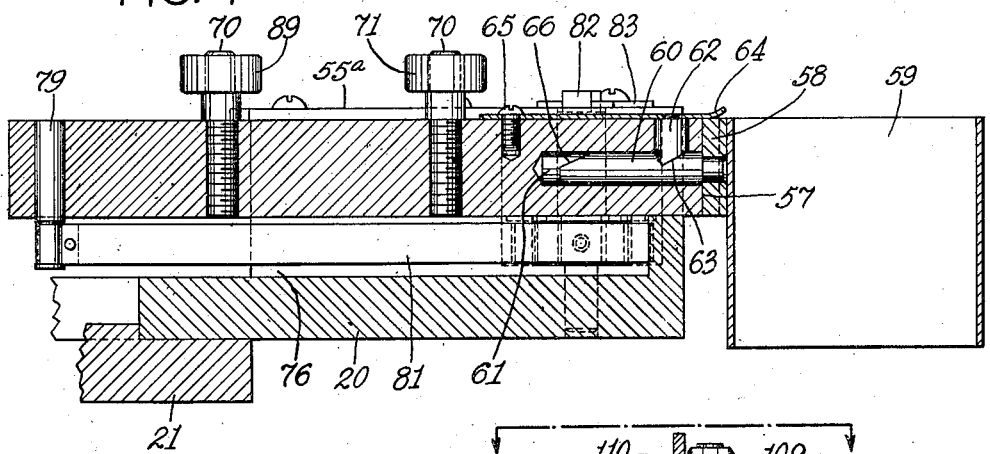
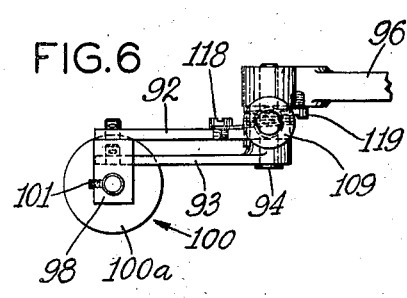
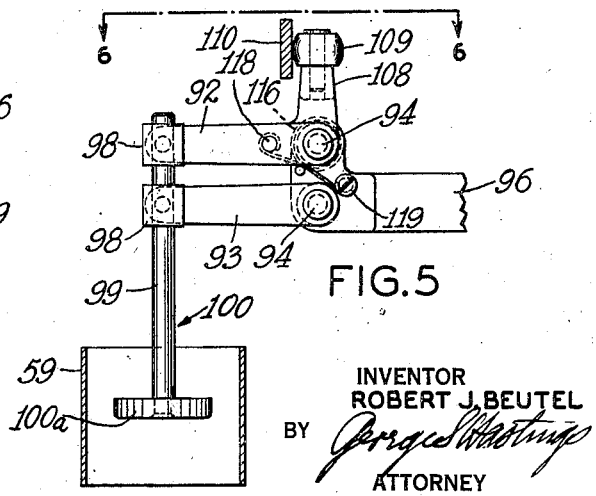
INVENTOR
ROBERT J. BEUTEL
BY
ATTORNEY Patented June 16, 1942

2,286,983

UNITED STATES PATENT OFFICE 2,286,983

DOUGH ROUNDING MECHANISM

Robert J. Beutel, Brooklyn, N. Y., assignor to American Machine & Foundry Company, a corporation of New Jersey Application May 9, 1940, Serial No. 334,185

18 Claims. (Cl. 107—9)

This invention relates to dough dividing and rounding machines of the character wherein the dough is separated into measured charges which are delivered one at a time in continuous succession to a dough rounding device from which the individual charges, after treatment, are successively discharged.

In the process of making rolls and other bakery products it is necessary to form a skin around the individual charges of dough prior to baking in order to prevent the escape of gases which in the course of baking render the product light and porous. Commercially, this has been accomplished in machines which round or ball the individual charges of dough by causing the surfaces thereof repeatedly to come in contact with forming surfaces. Thus, in one type of commercial machine, the measured charges of dough are deposited at the base of a rotating conical surface having in cooperation therewith, a fixed guiding surface or wall member which follows the contour of the cone as the guiding surface spirals upwardly from the base of the cone to near the top thereof. With that arrangement the individual charges of dough, due to the rotating movement of the conical surface, are caused to roll upwardly in contact with the conical surface and the guiding member to a point at the upper end of the guiding member where the charges of dough are delivered in rounded form. While such a machine can be made to operate continuously and automatically, its use is confined to dough having a spongy or soft character.

In another type of commercial machine adapted to handle stiff or hard dough, as well as the spongy or soft dough, there are provided a plate on which a batch of dough is deposited and an overlying set of knives defining a series of pockets, the knives being arranged to descend into contact or at least into close spaced relation with the plate so as to divide the dough into individual lumps which then are located in the respective pockets. In association with each pocket is an overlying pressure member arranged to be held in contact with the dough. Thereafter the plate and the pocket defining elements, i. e., the knives are relatively gyrated. The movement thus imparted to the dough charges with respect to the walls of the pockets wherein they are located rounds the charges into the desired shape and at the same time forms the necessary skin over the surface thereof. This machine, however, is unsuitable for continuous operation since, after each batch of dough has been treated, the knives have to be lifted away from the plate, the treated lumps of dough removed, and the machine prepared for the next operation.

In accordance with the instant invention, there is provided a machine which not only is continuous and automatic in operation but also can handle any type of dough at present in use. Briefly, the improved machine consists of a plurality of individual pockets arranged to be presented in continuous succession each at periodic intervals to a dough dividing apparatus timed automatically to deliver a measured charge of dough to the pockets as they are presented. The pockets with the individual dough charges therein proceed in order from the station at which the dough is received to a station at which the dough is discharged, thus freeing the pockets for the next periodic delivery of dough thereto as the machine continues to operate. During the intervals it takes the individual pockets to travel from the dough receiving station to the dough discharging station, the rounding operation takes place.

In the particular embodiment of the invention illustrated the pockets include each a vertical wall enclosing member open at the top, but closed at the bottom by a horizontal circular base member which is common to all the pockets. The wall enclosing members are separate from the base member, and while all the members alluded to have an equivalent rotational component of motion about a common center, the base member has an additional movement of a gyratory character with respect to the pocket walls and this latter movement causes a relative motion between the dough charges and the side walls of the pockets to effect the rounding operation. After the completion of the rounding operation, the discharge of the dough from the pockets is effected by an outward radial movement of the pocket defining walls, which movement slides the dough charges off the base member onto a travelling belt. Thereafter the pocket walls are returned to their normal positions preparatory to receiving the next dough charge.

Also in association with each of the pockets is a pressure or plunger member which, after the pocket has received a charge of dough, is arranged to descend into contact therewith. The plunger acts to hold the dough in contact with the base member under sufficient pressure to enable the gyratory motion to have its full effect in rounding the dough. Such a pressure member is necessary when processing hard or stiff doughs and it is designed so that the pressure applied by it may be adjusted according to the degree of stiffness the dough possesses. After the dough has been treated and just prior to the arrival of the pockets at the discharging station the plungers are lifted out of the pockets and clear of the tops thereof so as not to interfere with the discharge of the dough from the pockets or the subsequent reloading thereof.

A better understanding of the invention may be obtained from the following detailed description read in connection with the drawings wherein:

Fig. 2 is a vertical sectional view taken on the line 2—2 of Fig. 1;

Fig. 3 is an enlarged detail plan view of one of the dough rounding pockets;

Fig. 4 is a vertical sectional view on line 4—4 of Fig. 3;

Fig. 5 is an enlarged elevational view of one of the plunger members; and

Fig. 6 is a plan view of the same looking from line 6—6 of Fig. 5.

Figure 1:
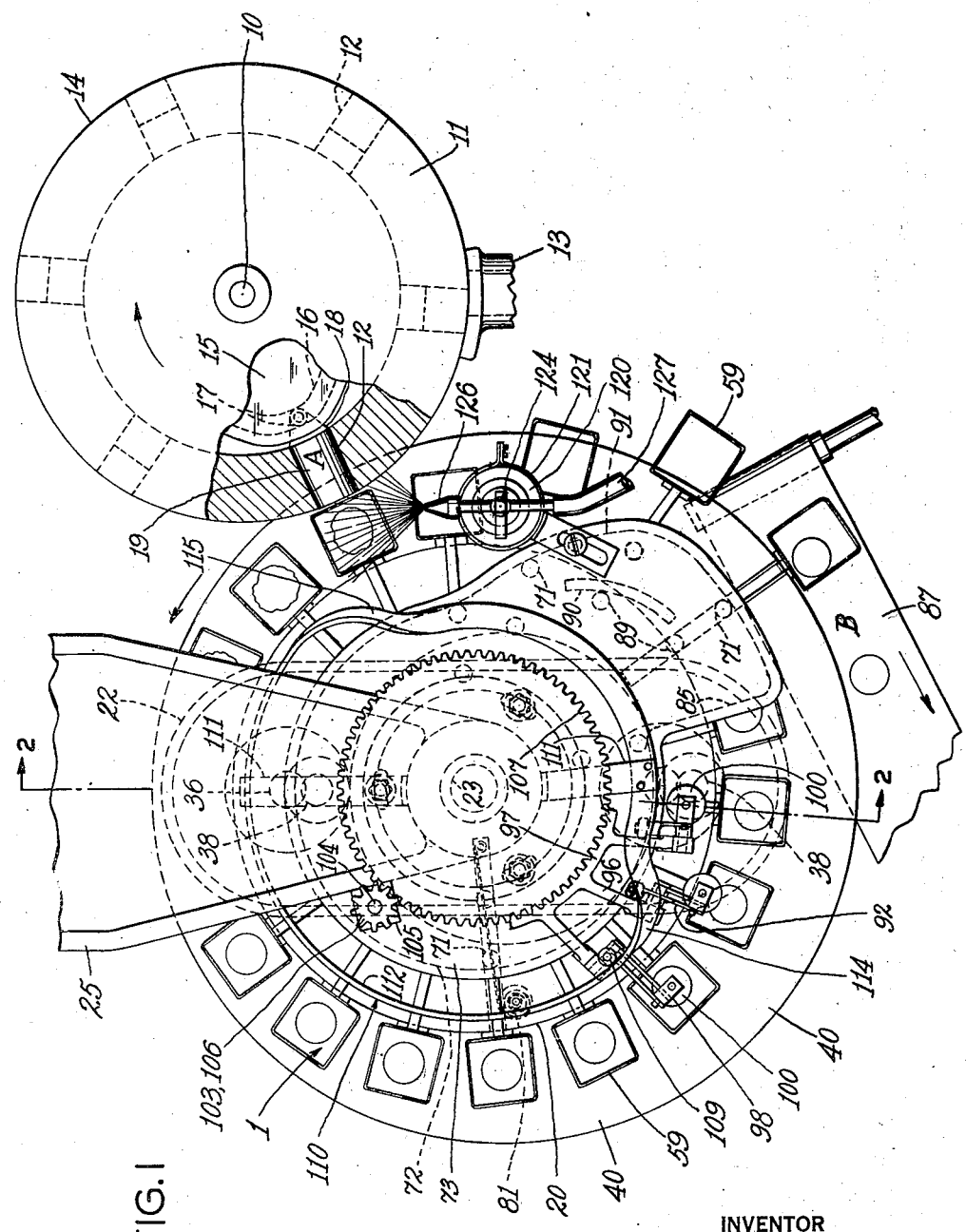
Fig. 1 is a plan view of the improved dough dividing and rounding machine.

As shown in Fig. 1, the dough is ejected under suitable pressure from a receptacle (not shown) through a nozzle 13 to a dough dividing apparatus consisting of an annular member 11 formed with a series of pockets 12 which are presented one at a time to the nozzle as the annular member is caused to rotate in the direction of the arrow about its center 10. The pockets are cylindrical in cross-section and of the same diameter as the nozzle opening. They are open at their outer ends, and are provided each with a plunger 19 movable in a radial direction inwardly to form a dough receiving and measuring pocket and outwardly to discharge the dough therefrom. The plungers are formed at their inner ends each with a projecting portion 18 on which there is mounted an antifriction roller 17 arranged to track in the groove 16 of a stationary cam 15 disposed within the annular member 11. The configuration of the cam groove 16 is such that as each pocket arrives in registry with the nozzle 13 the plunger 19 will be in its fully retracted position to provide the pocket in which the charge of dough is received. As the annular member 11 continues to rotate, the plunger is forced outwardly (by virtue of the shape of the cam groove) until it reaches a station A at which point the plunger will be located at its outermost position wherein the measured mass of dough is completely ejected from the pocket. The outer face of the nozzle 13 conforms to the outer peripheral surface 14 of the annular member 11 and slides in close engagement therewith so that during the interval between the departure of a loaded pocket until the arrival of the next empty pocket the nozzle will be closed.

The dough dividing apparatus just alluded to may be the same as that disclosed in U. S. Patent No. 1,793,981, granted to C. O. Westcott et al. and reference may be had to that patent, if desired, for a more detailed description of the parts.

The dough rounding apparatus, itself, (see Figs. 1 and 2) consists of a series of pockets 1, the bottoms of which are formed by a large horizontally disposed annular plate 40 common to all of the pockets, and individual vertical peripheral wall members 59 open at the top.

For the time being it may be considered that the individual pockets 1 (including the base plate 40 forming the bottoms thereof), rotate as a unit in the direction of the arrow. This rotation is in timed relation with that of the dividing machine head 11 and the parts are so arranged that as each pocket arrives at the station A a charge of dough as measured by the dividing head will be deposited into the pocket. After receiving the charge of dough, the pockets continue to rotate until they reach a dough discharging station B whereupon the wall member 59 of each pocket as it arrives is moved radially outwardly forcing the contained lump of dough which has been treated and rounded in the meantime, off the plate 40 and onto a travelling conveyor 87. Thereafter the side wall members 59, as the rotation proceeds, are moved radially inwardly to their original positions, preparatory to receiving the next charge of dough.

In order that the peripheral wall member 59 of the pockets 1 may partake of the motion heretofore described, they are mounted at the outer ends of a series of arms 56 slidably arranged in grooves or guideways 55 radially disposed at equally spaced intervals around a horizontal rotatable turret plate 20, the arms, as shown in Figs. 3 and 4, being held against upward displacement out of the guideways by plates 55a screwed to the turret plate at the top and which at their lateral edges overlap the arms for a short distance. The turret plate 20 in turn is secured to an underlying flange 21 formed at the top of a large housing 22 keyed to a vertically arranged driven shaft 23 journalled at the top and bottom in fixed portions 24 and 27 of the machine frame. The fixed machine portion 24 is formed at the end of an overlying arm 25 secured to a part of the framework not shown. According to this arrangement, during each rotation of the vertical shaft 23, the pocket members 59 are rotated from the dough receiving position A to the dough discharging position B and thence on to the dough receiving station again ready for the next cycle of operation.

The outward and inward movement of the pocket wall members 59 to effect the discharge of the lumps of dough and the return of said members to their normal innermost positions is controlled by a cam track 72 formed in the lower face of a member 73 overlying the arms 56 on which the wall members 59 are mounted and which is secured to a fixed portion of the machine frame. Each of the arms 56 is provided with two antifriction rollers 71 and 89 spaced apart in a radial direction and which are rotatably mounted on studs 76 threaded into the arms from the top (see Fig. 4). These antifriction rollers extend upwardly into the cam track 72, the outer antifriction roller 71 being constrained to track along the outer edge of the cam track under tension provided by a coil spring 81 located beneath the arm in a recess 75 formed in the turret plate 20 for the purpose (Figs. 3 and 4). The inner convolution of the spring is fastened to a vertical arbor 82 rotatably arranged in a hole drilled in the turret plate, whereas the spring at its outer end is anchored to a pin 79 projecting downwardly from the arm 56 at its inner end. The arbor 82 projects somewhat above the retaining plate 55a and is squared at the top to enable the tension of the spring to be adjusted. The arbor is held in its adjusted position by a small plate 83 notched as at 84 to the dimensions of the squared head and which is screwed to the turret plate 20 above the retaining plate 55a.

Throughout the larger portion of pocket travel the cam track 72 is concentric with the vertical shaft 23, i. e., from the dough receiving position A to the dough discharging position B, and during such travel the pocket wall members are held in their innermost positions by the cam track action. However, as the pocket wall members approach the dough discharging position, the radius of the cam track abruptly increases (as at 85) and, when the pockets reach this point, they suddenly move outwardly under the action of their respective springs 81, the throw of the track being sufficient here to permit the pocket wall members 59 to clear the underlying pocket base plate 40 with the result that the lumps of dough at this point are forced off the base plate and deposited upon the underlying conveyor 87 (see Fig. 1). Somewhat further on, an arcuate track portion 90 located in the cam track is picked up by the inner anti-friction rollers 89 on the arms 56 as they arrive and which, as the rotation proceeds, gradually draws the pocket wall members inwardly. Shortly thereafter the outer antifriction rollers 71 again engage the outer edge of the cam track 72 which acts gradually to return the pockets to their innermost positions preparatory to the next periodic delivery of dough thereto.

As stated previously, the base plate 40 forming the bottoms of the pockets has a rotational component of motion about the vertical shaft 23 equal to the rotational motion of the pocket walls 59. In addition, however, it has a gyrating movement with respect to the pocket wall members themselves, and it is this gyrating motion of the plate 40 that causes the charges of dough in the pockets to move with respect to the pocket walls. The amplitude of the gyrating movement is such as to cause the dough charges to strike against the pocket walls resulting in the rounding operation and the formation of the skin thereon.

The mechanism by which this duplex motion of the plate 40 is obtained is best illustrated in Fig. 2. Here it will be observed that the plate 40 is formed at the bottom with two diametrically opposed bosses 39 drilled each to receive a crank pin 38 eccentrically fixed, one with respect to a crank shaft 36, and the other with respect to a crank shaft 37, both shafts being journalled in the housing 22 but in diametrically opposed relation as regards the shaft 23 to which the housing 22 is keyed. Since the housing 22 is the member on which the turret plate 20 is mounted, the rotation of the housing will give to the plate 40, as well as to the pocket wall members 59, the same rotational component of motion about the vertical shaft 23. In addition, however, the two shafts 36 and 37, are rotated about their own vertical axes and this rotation, because of the eccentric positions of the crank pins 38, provides the gyrating movement previously alluded to. At this point it might be stated that, in order to obtain a smooth running machine, the plate 40 rests upon thrust bearings which encircle the crank pins 38 and further that weights are provided to counterbalance the eccentric weight.

The motive power for rotating the vertical center shaft 23 and the smaller offset shafts 36 and 37 is obtained from a common drive shaft 31 which also may be used to drive the dough dividing mechanism in proper timed relation with the shaft 23. The drive from the shaft 31 is through a pair of bevel gears 30 and 29, the former being formed at the end of the shaft 31, and the latter being fixed on a sleeve 28 encircling the shaft 23 and arranged for relative rotation therewith. The shafts 36 and 37 are driven directly from the sleeve 28 by a gear 33 fixed thereon and which meshes with two gears 34 and 35 fixed respectively on the small shafts 36 and 37 at the lower ends thereof. The central shaft 23 on the other hand is driven from a gear 41 at the lower end of the sleeve 28 through a train of reduction gears 42, 43, 46, 48, the last of which meshes with a gear 49 fixed on the shaft 23 near its lower end. The driving arrangement just described permits the dough pockets to be rotated at a speed consistent with the time required to process the dough as it passes from the dough receiving station to the dough discharging station and at the same time gyrates the plate 40 at a sufficiently high speed for proper processing.

There remains now to describe the plunger members 100 that are projected into the pockets to engage the lumps of dough at the top during the rounding operation and which force the dough into contact with the plate 40 with sufficient pressure to insure the proper rounding effect. These plunger or pressure members have their greatest utility where the dough being treated is of the hard or stiff variety. Referring to Figs. 1, 2, 5 and 6, it will be observed that these pressure members 100 are carried by a spider consisting of a ring member 97 concentrically arranged with respect to the vertical shaft 23 and rotatably mounted on a flange 74 formed at the lower end of a fixed portion 24 of the machine. The spider further includes a series of arms 96, one for each dough pocket, and formed integrally with and projecting outwardly from the ring member 97. Fixed to the ring member at the top is a gear 102 having the same pitch diameter as another gear 107 which is pinned to the vertical shaft 23 at the top. The rotational movement of the top gear 107 (which of course is that of the shaft 23) is transmitted to the gear 102 associated with the spider through a pair of pinions 103, 106 meshing one with each of the gears 102, 107 and connected together by a vertical shaft 104 suitably journalled in a bearing 105 carried by the fixed machine frame. According to this arrangement, the spider and consequently the plunger members will rotate about the vertical shaft 23 in unison with the pockets 1.

Each plunger member includes a circular plate 100a mounted at the lower end of a vertical rod 99 which at the top passes through holes drilled in a pair of vertically spaced blocks 98, the blocks in turn being pivotally connected at the outer ends of a pair of parallel motion arms 92 and 93. The parallel motion arms in turn are rotatably mounted on pins 94 superimposed one above the other and which project laterally from the associated spider arm 96. The plunger rod 99 is secured in the blocks 98 by means of set screws 101 which afford a ready means of adjusting the rod in a vertical direction depending upon the pressure it is desired to apply to the dough. The plate 100a at the lower end of the rod 99 may be arranged to rotate with respect thereto or not as desired.

When the pockets 1 are at the dough receiving station A, it is necessary, of course, that the plungers be located out of the pockets and clear of the tops thereof so as not to interfere with the loading of the pockets by the dough dividing apparatus. To this end the upper parallel motion arm 92 associated with each of the plungers is formed with an arm portion 108 extending vertically upwards. At the top of said arm portion 103, there is provided an antifriction roller 109 which is urged into engagement with a guiding rail 110 by means of a torsion spring 116 encircling the hub portion of the parallel motion arm, and which is anchored at one end to the parallel motion arm 92 and at its other end to the spider arm 96 as by screws 118 and 119. The rail 110 encircles the vertical center shaft in spaced relation therewith and is secured in place by overlying brackets 111 fixed to the machine frame. From a position 115 just beyond the dough receiving station to a position 114 somewhat in advance of the dough discharging station the rail 110 has its inner face vertically disposed. At the latter position 114, however, the rail twists so that what in advance of that position was the inner vertical face is beyond that position a lower horizontal face. The horizontal disposition of the rail continues until just beyond the dough receiving station where it again twists back to the vertical position originally mentioned (see Fig. 1). Since the face of the rail just alluded to is that against which the antifriction rollers 109 associated with the plungers 100, are constrained to move, it is apparent that when the face of the rail is vertically disposed the plungers are located in their active positions wherein they engage the dough in the pockets (see Fig. 5). However, where the rail 110 starts to twist into the position wherein its active face is horizontal, the rollers 109 following its twisting configuration act to turn the arms 108 in a direction to lift the plungers out of the pockets and where the rail assumes its horizontal disposition the plungers will be fully retracted and located clear of the tops of the pockets (see Fig. 2 at the right). Incidentally, the upward movement of the plungers is sufficient to permit the same to clear the member 73 wherein the cam track 72 is located which controls the positions of the pockets. The plungers continue to move in their raised positions until just beyond the dough receiving station A where they are again lowered into engagement with the dough in the pockets as the rail 110 twists back into vertical position.

It will be noted (Figs. 3 and 4) that the wall enclosures 59 which in part constitute the dough receiving pockets are square since thus far it has been found this shape gives the most satisfactory results. In service, of course, it will be necessary to clean the pockets and also to substitute larger or smaller pockets on occasions depending upon the size of the dough charges to be treated. For this reason the pocket wall enclosures 59 are mounted in their supporting arms 56 so as to be readily removable therefrom. The mounting consists in part of a T-shaped member 58, one portion of which is welded or otherwise secured to the pocket wall at its rear outer face, whereas the other portion extends into a straight-sided recess 57 formed in the end of the pocket supporting arm 56, this construction acting to prevent accidental turning of the pocket wall member when the machine is in use. The mounting further consists of a rod 60 extending perpendicularly from the rear face of the pocket wall and which is secured in the T-shaped member 58. The rod fits into a cylindrical hole 61 drilled in the end of the pocket supporting arm and is held therein by a spring controlled detent pin 62, the lower end of which is V-shaped to conform to a V-shaped notch 63 formed in the rod 60 at the top. The detent pin 62 extends downwardly through a hole drilled in the top of the pocket supporting arm and is fastened at its upper end to a leaf spring 64 resting on the arm 56 to which it is secured by a screw 65. The rod 60 is bevelled at its inner end as at 66 so as readily to lift the detent against the tension of the spring 64 as the pocket member is pushed into position. Furthermore, while the rear face of the V-shaped notch 63 is somewhat steeper than the front face so as to render accidental outward displacement relatively impossible, the slope is nevertheless such that the pocket can be removed without difficulty. Indeed, if necessary, the spring 64 can be lifted manually so as to withdraw the pin 62 from the V-shaped notch, the spring for this purpose being curved upwardly somewhat at its outer end.

Finally it should be stated that it is desirable to spray the dough charges with an oil as they are deposited in the pockets from the dough dividing apparatus to facilitate the formation of the skin thereon, and also the pocket walls so as to prevent the dough from sticking thereto. To this end a container of oil 120 (Fig. 1) is adjustably secured to a fixed portion of the machine as by a bracket 121, and is provided with an air operated nozzle 126 of any well known construction and which is directed at the elements to be sprayed. The nozzle, of course, may be supplied with means for regulating the quantity of oil to be sprayed.

In the accompanying drawings, the invention has been shown merely in preferred form and by way of example, but obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. A dough treating machine including, in combination, a receptacle wherein lumps of dough are confined for a rounding treatment, and mechanism operating automatically and in timed relation to apply a predetermined pressure to the lumps of dough during their rounding treatment in the receptacle, said mechanism including a member adapted to enter said receptacle and press the lump of dough therein during the rounding treatment, and means for varying the pressure imposed upon the lump of dough by said member.

2. A dough treating mechanism including, in combination, a pocket wherein individual lumps of dough are confined one at a time for a rounding treatment, means for moving the pocket from a dough receiving station to a dough discharging station during which movement the rounding treatment is effected, a pressure device associated with the pocket, and means for automatically moving the pressure device at predetermined stages of the dough rounding treatment into a position within the pocket for engaging the dough in the pocket and thence out of said position.

3. A dough treating mechanism including, in combination, a pocket wherein individual lumps of dough are confined one at a time for a rounding treatment, a member coacting with said pocket to round the lump of dough therein, means for moving the pocket periodically from a dough receiving station to a dough discharging station during which movement the rounding treatment is effected, a pressure device associated with the pocket and movable in synchronism therewith, and means for automatically moving the pressure device at predetermined stages of the dough rounding treatment into a position for engaging the dough in the pocket and thence out of said position.

4. A dough treating machine including, in combination, a plurality of pockets adapted to receive individual lumps of dough, said pockets comprising individual wall enclosure members and a common horizontal bottom member, means for moving the pockets in continuous succession from a dough receiving station to a dough discharging station, and means for gyrating the common bottom member to round the lumps of dough.

5. A dough treating machine including, in combination, a plurality of pockets adapted to receive individual lumps of dough, said pockets comprising individual wall enclosure members and a common horizontal bottom member, means for moving the pockets in continuous succession from a dough receiving station to a dough discharging station, and means for imparting an additional gyrating movement to the common bottom member to round the lumps of dough.

6. A dough treating machine including, in combination, a plurality of pockets adapted to receive individual lumps of dough, said pockets comprising individual wall enclosure members and a common horizontal bottom member, means for rotating the wall members and the bottom member about a common center so as to move the pockets one at a time in continuous succession from a dough receiving station to a dough discharging station, and means for gyrating the common bottom member to round the lumps of dough.

7. A dough treating machine including, in combination, a plurality of pockets adapted to receive individual lumps of dough, said pockets comprising individual wall enclosure members and a common horizontal bottom member, means for rotating the wall members and the bottom member about a common center so as to move the pockets one at a time in continuous succession from a dough receiving station to a dough discharging station, and means for imparting an additional gyratory movement to the base member to round the lumps of dough.

8. A dough treating machine including, in combination, a plurality of pockets adapted to receive individual lumps of dough, said pockets comprising individual wall enclosure members and a common horizontal bottom member, means for rotating the wall members and the bottom member about a common center so as to move the pockets one at a time in continuous succession from a dough receiving station to a dough discharging station, means for gyrating the common bottom member to round the lumps of dough, and a common drive for both of said means.

9. A dough treating machine including, in combination, a plurality of pockets adapted to receive individual lumps of dough, said pockets comprising individual wall enclosure members mounted in a common turret for rotation by a centrally located shaft, a common horizontal bottom member for the pockets movable relatively to the wall members thereof and likewise arranged for rotation by said shaft, said pockets being adapted as the shaft is rotated to move one at a time in continuous succession from a dough receiving station to a dough discharging station, and means for imparting an additional gyratory movement to the common bottom member to round the lumps of dough.

10. A dough treating machine including, in combination, a plurality of pockets adapted to receive individual lumps of dough, said pockets comprising individual wall enclosure members and a common bottom member and arranged all for rotation about a common central shaft to move the pockets one at a time in continuous succession from a dough receiving station to a dough discharging station, means for moving the wall members and the bottom member relatively with respect to each other to round the lumps of dough, and means acting automatically as the pockets during their rotation arrive at the dough discharging station to move the wall members outwardly with respect to the bottom member, thereby pushing the lumps of dough off said bottom member and discharging them from the pockets and later to restore the wall members inwardly to their normal positions prior to receiving the next charge of dough.

11. A combination according to claim 10, wherein the individual wall enclosure members are carried by means arranged in a common turret and which are guided radially in said turret as the wall members move to and from their outermost dough discharging positions, and means for controlling the radial movement of said wall member carrying means.

12. A dough treating machine including, in combination, a plurality of pockets adapted to receive individual lumps of dough, means acting to round the lumps of dough while in the pockets, a pressure device associated with each pocket and movable into and out of contact with the lump of dough therein at predetermined stages of the dough rounding operation, and common means controlling the operation of all of said pressure devices.

13. A dough treating machine including, in combination, a plurality of pockets adapted to receive individual lumps of dough, means for moving said pockets in continuous succession from a dough receiving station to a dough discharging station, means for rounding the lumps of dough during such movement of the pockets, a pressure device associated with each pocket and movable into the pocket for engagement with the dough and thence out of the pocket both at predetermined stages of the machine cycle, and common means for controlling the operation of all of said pressure devices.

14. A dough rounding machine including in combination a plurality of traveling open bottom enclosures adapted to enclose individual pieces of dough, a horizontal traveling support cooperating with said enclosures to support the dough pieces and convey them from a receiving to a delivery station, and means for imparting an additional gyratory motion to said support to round said pieces.

15. A dough rounding machine including in combination a plurality of traveling open bottom enclosures adapted to enclose individual pieces of dough, a horizontal traveling support cooperating with said enclosures to support the dough pieces therein, means imparting movement to said traveling support and said enclosures to move the same substantially in unison to convey the dough pieces from a receiving to a delivery station, and means for imparting an additional gyratory motion to said support relative to said enclosures to round said pieces.

16. A dough rounding machine including in combination a plurality of traveling open bottom enclosures adapted to enclose individual pieces of dough, a traveling support cooperating with said enclosures to support the dough pieces and convey them from a receiving to a delivery station, means for imparting an additional gyratory motion to said support to round said pieces, a traveling carrier for said open bottom enclosures, and means detachably securing said enclosures to said carrier to permit ready substitution of different sizes of enclosures.

17. A dough rounding machine including in combination a plurality of traveling enclosures open above and below, adapted to enclose individual pieces of dough, a traveling support cooperating with the underside of said enclosure to support and round the dough pieces and convey them from a receiving to a delivery station, and traveling elements each adapted to cooperate with one of said enclosures from above and to engage the upper side of dough pieces therein to grip the same against said support to increase the effectiveness of said support in acting on said pieces.

18. A dough treating machine including, in combination, a set of pockets wherein individual lumps of dough are confined for treatment one at a time, means for presenting each pocket in sequence to a position to receive a lump of dough, means for rounding the lump of dough in each of said pockets, means operating automatically at the conclusion of the dough rounding operation to discharge the treated lump of dough from each pocket, pressure devices associated with said pockets, and means acting automatically to lower the pressure devices into said pockets and into engagement with the lump of dough in each pocket and later to raise the pressure devices out of each pocket prior to presentation to the position at which a lump of dough is inserted in the pocket.

ROBERT J. BEUTEL.